Nov. 24, 1959   R. H. COOPER   2,913,787
SHELL MOLD COMPOSITION AND METHOD OF MAKING SAME
Filed Sept. 26, 1956
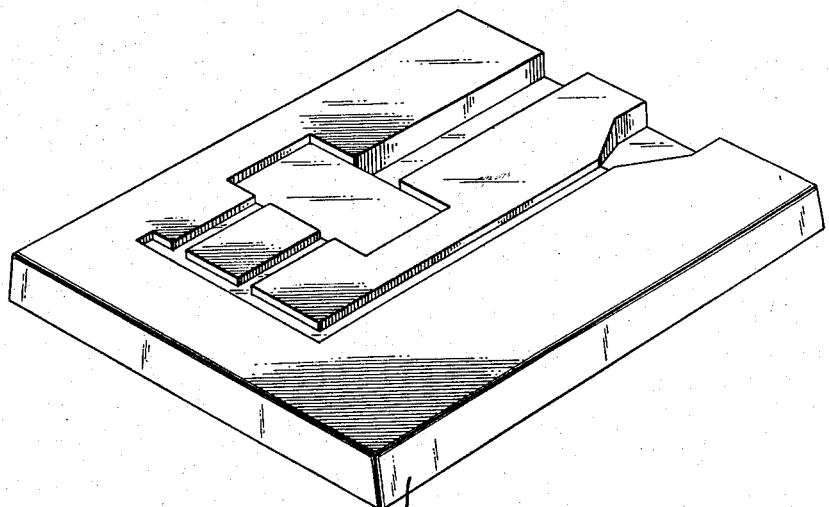
Shell mold fabricated from coated sand composition containing catalyzed phenolic liquid resin binder and solid flow-assisting agent
INVENTOR.
Ronald H. Cooper
BY
Griswold & Burdick
ATTORNEYS United States Patent Office 2,913,787
Patented Nov. 24, 1959

2,913,787

SHELL MOLD COMPOSITION AND METHOD OF MAKING SAME

Ronald H. Cooper, Clare, Mich., assignor to The Dow Chemical Company, Midland, Mich., a corporation of Delaware Application September 26, 1956, Serial No. 612,284

20 Claims. (Cl. 22—193)

This invention relates to shell molds and has particular reference to an improved coated sand composition that is especially well suited for the fabrication of shell molds and to shell molds that are prepared from such composition. It also relates to a method for the fabrication of shell molds that utilizes the improved composition.

Shell molding techniques represent a relatively recent development that is finding increasing favor for employment in foundry practice for metal casting operations. In shell molding, rigid, thin-walled molds comprised of a thermoset resin-bonded mixture of sand or other fine grained refractory material are employed for holding the molten metal which is being cast. The resin bound sand molds are ordinarily prepared by permitting a free-flowing granular mixture of sand and a suitable thermoplastic and thermosetting resin to come in contact with a hot metal pattern for a sufficient period of time to permit a layer of the mixture to agglomerate while adhering to the surface of the pattern and form a reproduction thereof while the resin is in a thermoplastic temperature range. The formed sand molds are then thermoset to form the desired strong and rigid structures having high gas permeability, good surface smoothness and exceptional dimensional stability.

Such mold forms, in which either ferrous or non-ferrous metals may be cast, frequently permit better castings to be obtained than by conventional methods due to their more porous structure and more precise surface finishes than ordinary sand molds. In addition, they oftentimes result in a more economical foundry practice than may be achieved with conventional sand molds since they require less sand than the usual green sand molds and can be fabricated with very small quantities of relatively inexpensive resin binders. Furthermore, they are lighter and less cumbersome and awkward to handle or manipulate than the traditional sand molds and eliminate much of the hazard and unpleasantness due to dust and powder that obtains in the practice of the old technique.

Most resin-bonded shell molds may be fabricated in a manner similar to that which is utilized in the so-called Croning process which has been described in F.I.A.T. Final Report No. 1168 (dated May 30, 1947) by the Field Information Agency, Technical, United States Department of Commerce.

While dry resins may be employed in the sand compositions utilized for the fabrication of shell molds, there are distinct advantages to be derived in the utilization of coated sand compositions which have been prepared by coating the refractory material with a suitable liquid resin. The use of coated sand generally results in substantial reductions in the amounts of resin that are required in addition to minimizing segregation between the resin and the sand and reducing the quantity of organic matter that is present on the surface of the mold. Coated sands also practically eliminate dust problems in the fabrication of the molds and frequently permit faster curing cycles after initial formation of the shell mold reproduction of a desired pattern.

In order to prepare resin coated sands for the fabrication of shell molds, it is necessary for the binding resin that is employed to be in a liquid condition for the sand coating operation. This is commonly achieved by dissolving the resin in a suitable solvent for the sand coating operation and subsequently evaporating the solvent, oftentimes with the assistance of heat or by prolonged exposure to the atmosphere, or both, from the coated sand composition. In another process that is frequently utilized, the sand is coated by a thermally liquefied resin, molten by exposure to air at elevated temperatures during its mixing with the sand or by heat from a preheated sand or by other application of heat, and subsequently cooled.

It would be highly advantageous to provide a coated sand composition that would be particularly adapted for the fabrication of excellent shell molds and the like structures that could be prepared by a cold production technique which did not necessitate the employment of heat or solvents in the formulation of the free-flowing coated sand composition.

These desiderations and many other advantages and benefits may be achieved with a coated sand composition that is in accordance with the present invention which is comprised of a preponderant proportion of sand or an equivalent refractory material in discrete particle form; a binding quantity of a phenolic liquid resin; a minor content of a flow-assisting resin that is selected from the group consisting of a "novolak type" phenol-formaldehyde resinous condensation product and a thermoplastic "lignin type" resin derived from wood and containing both methoxyl and hydroxyl groups in its structure; a small quantity of a catalyst selected from the group consisting of powdered magnesium oxide, aqueous slurried magnesium oxychloride, aqueous slurried magnesium oxysulfate, and mixtures thereof; and, optionally, another small quantity of hexamethylenetetramine or an equivalent curing agent or accelerator for phenolic resins including ethylene diamine, diethylene triamine and like relatively low molecular weight polyamines and paraformaldehyde.

The coated sand compositions of the present invention may be formulated by thoroughly mixing the ingredients in the cold while permitting the catalyst additament to initially set or auto-harden the liquid phenolic resin by dehydration upon the sand grains to yield a dry, free-flowing resin coated sand having thermoplastic and thermosetting characteristics. In many cases, particularly when powdered magnesium oxide is employed as a catalyst, it may be particularly beneficial to premix the catalyst and the sand prior to addition of the phenolic liquid resin. It is usually preferable to add the flow assisting "novolak" or "lignin type" resin to the composition after the sand has been wet-coated with the phenolic liquid resin and before it has self-set on the coated granules. The accelerator curing agent may conveniently be added to the phenolic liquid resin before it is employed to coat the sand.

The time that may be required for the liquid resin to become dehydrated and initially set upon the sand granules to provide a dry, free-flowing coated sand composition depends to a great extent upon the quantity and activity of the catalyst employed in the composition and to a lesser extent upon the mixing and formulating technique that is utilized. The coating may be accomplished by batch-wise or continuous techniques. In some cases, it may be desirable to permit the freshly wet sand to air dry for a short period (5 to 10 minutes) to permit escape of the water vapor from the composition and to facilitate its subsequent granulation to a free-flowing condition. Ordinarily, the wet coating and subsequent provision of the dry coated sand may be accomplished in periods that may vary from 10 minutes to 2 hours. It is usually beneficial for the dry, free-flowing coated sands to be comminuted to such a degree during the mixing operation in which the applied liquid resin is auto-hardening on the sand that the preponderance of the coated sand, usually at least about 70 percent by weight, has an average particle size that is finer than about 40 mesh in the U.S. sieve series. Although there is no necessity to employ heat in the preparation of the coated sand compositions of the present invention, it is permissible to do so if desired. The presence of heat during the sand coating operation has no deleterious influence provided thermosetting temperatures are not involved. In addition, it may at times be beneficial to permit the freshly prepared mixture to auto-harden in a stream of air, which may be cold air, to assist in removing the water vapor from the material and to facilitate obtaining a dry and free-flowing composition.

Shell molds may be prepared readily with coated sand compositions that are in accordance with the present invention by the practice of conventional dump-box techniques. Core blowing techniques, wherein the auto-hardened composition is distributed with the assistance of a pneumatic blast may also be utilized, if desired. Pattern temperatures between about 425 and 500° F. may generally be employed with advantage with contact times of the coated sand composition on the pattern between 10 to 30 seconds in order to form the composition which is usually thermoplastic in the temperature range from about 125 to 250° F. The formed shell molds may then be cured or thermoset at a temperature between about 250 and 600° F. or higher, depending on the curing times that are involved. Frequently, the curing may be satisfactorily accomplished by exposing the pattern formed shell molds to a temperature in the neighborhood of 600° F. for periods from 20 to 50 seconds. One of the halves of a shell mold fabricated from a composition in accordance with the present invention is illustrated in the accompanying drawing.

Any ordinary sand or other refractory material in discrete particle form may be employed in the practice of the present invention. Advantageously, the sand or its equivalent that is employed has a fineness in accordance with the values proposed by the American Foundryman's Society (AFS) that is in the numerical range between about 25 and 180. Such sands, for example, as the types which are known as Berkeley Float Sand, Juniata Sand, Lake Sand, Vassar Sand, Wedron Sand and the like may be beneficially employed. It is desirable that the sand be clean and substantially free from foreign metal oxides, clay, moisture and organic matter. In many cases, it may be more advantageous to employ a sand having an AFS fineness number from about 50 to 125. Very frequently, sands that have an AFS fineness number in the neighborhood of 100 may be preferable. The compositions of the invention should generally be prepared with at least about 85 percent by weight of sand. This is not only for reasons of greater economy but because lesser sand contents may allow solidified, auto-hardened plastic masses to form which are more difficult to render to a fine particle, free-flowing condition. In addition, the presence of excessive quantities of resin binder is usually undesirable in shell molds in that, among other complications, it may excessively restrict the porosity of the mold and cause excessive firing and smoke and fumes to occur during the metal casting. Ordinarily, a quantity of sand between about 94 and 98 percent by weight in the coated sand composition may not only be suitably economical but also usually provides optimum results and performance in the shell molds prepared therefrom.

The aqueous phenolic liquid resin that is employed for coating the sand in compositions according to the invention may advantageously be a liquid phenol-aldehyde condensation product such as a liquid phenol-formaldehyde resin. Such resins may be prepared conveniently by reacting aqueous mixtures of phenol and formaldehyde, in a known manner, under the influence of basic catalysis. Ordinarily, such liquid resins have a greater than 1:1 mole ratio of formaldehyde to phenol, respectively, in their composition. It may frequently be desirable for a phenol-formaldehyde liquid resin to be employed that has a mole ratio of formaldehyde to phenol in the neighborhood of 1.45:1, respectively with a solids content of at least 50 to 70 percent by weight. The viscosity of such an aqueous phenol-formaldehyde resin, which may oftentimes be characterized as being a stage "A" resin, may vary from about 100 to 1,000 centipoises when measured at a temperature of about 77° F. The liquid resin may have a pH between 5 and 9. Preferably, the liquid phenol-formaldehyde resin that is utilized has a solids content in the aqueous vehicle of about 60 to 70 percent by weight and a pH between 5 and 7 with a viscosity at 77° F. of about 500 centipoises. While from 1 to 10 percent by weight of the liquid resin may be employed in the invention, it is generally more beneficial to employ an amount that is between about 2 and 6 percent by weight.

Such a catalyzed aqueous phenolic liquid resin binder is described in U.S. Patent Number 2,869,194, issued January 20, 1959 to Ronald H. Cooper, covering "Auto-Hardening Phenol-Formaldehyde Composition and Method of Preparing Shell Molds Therefrom," filed concurrently herewith on September 26, 1956 as copending application, Serial No. 612,283.

The flow assisting solid resin that is incorporated in the coated sand composition facilitates formation of the shell mold by ameliorating the response and the agglomerating propensity of the coated sand to the heated pattern with which it is in contact during the fabricating operation. The "novolak" type resin that is employed for such purpose may be the conventional normally solid and permanently thermoplastic phenol-formaldehyde condensation product of the acid-catalyzed condensation of one mole of phenol with from 0.5 to 0.9 mole of formaldehyde and that, for example, contains from three to ten phenolic units in its molecule and is prepared from the common phenol, $C_6H_5OH$, or substituted derivatives thereof. The "lignin type" resins that may be employed as flow-assisting additaments include, as has been indicated, various wood derivative thermoplastic resinous materials in which the molecules contain both methoxyl and hydroxyl groupings. Such resinous materials may be obtained from many of a variety of wood products including sawdust, waste liquor from paper manufacture, wood chips and the like. They may be prepared either by the physical or chemical treatment, or both, of such wood derivative substances. By way of illustration, one of the lignin type thermoplastic resinous materials (similar to that which is available from the Hercules Powder Company under the trade-designation "Vinsol") is an essentially gasoline-insoluble resinous material that is prepared by extracting a resinous wood with a coal tar hydrocarbon solvent, evaporating the solvent to leave a residue comprised of a mixture of wood rosin and thermoplastic resinous material, and subsequently extracting the rosin with a suitable petroleum solvent to isolate the desired gasoline-insoluble resinous product. Another lignin type thermoplastic resinous material of the alkali lignin variety (similar to that which is available from the Mead Corporation under the trade-designation "Meadol") may be obtained from waste soda pulp liquor by precipitating the black liquor with carbon dioxide, filtering the precipitate, washing the filtered precipitate with dilute sulfuric acid to remove any remaining black liquor and drying the desired alkali lignin resinous product.

More satisfactory results may oftentimes be obtained with a novolak type resin. Generally, between about 0.5 and 3.0 percent by weight of the flow-assisting agent, based on the weight of the composition, may be suitably employed in the coated sand compositions.

Ordinarily, between about 0.5 and 2.0 percent by weight of the catalyst, based on the weight of the composition, may be utilized. Advantageously, finely divided magnesium oxide is employed as a catalyst in the practice of the invention. It is usually preferable to use a magnesium oxide powder that has an average particle size which is not larger than about 40 mesh in the U.S. sieve series. When magnesium oxide is employed as a catalyst, the time that is required for the wet resin coating on the sand to self-set to a dry condition depends to a great extent upon the initial setting characteristics, measured as a function of time, of the magnesium oxide according to ASTM Specification No. C254–50T. Thus, as is illustrated in the following Table 1, quantitatively uniform and equivalent coated sand compositions can be prepared having varied self-setting times for the applied resin by employing magnesium oxide catalysts that have different ASTM setting times. Each of the tested compositions in Table 1 contained about 92.5 percent by weight of ordinary AFS 100 sand that had been uniformly coated with a mixture of about 1.5 percent by weight of the catalyst and about 6 percent by weight of a liquid phenol-formaldehyde resin containing about 70 percent by weight of solids in which the mole ratio of formaldehyde to phenol was about 1.45:1. The liquid resin had a pH of about 5 and a viscosity, at 77° F., of about 500 centipoises.

*Table 1.—Self-setting time of various coated sands as affected by initial setting time of magnesium oxide catalyst in resin binder*

| Composition | Initial Setting Time of MgO, hrs. | Self-Setting Time of Composition |
|---|---|---|
| A | 0.1 | 10–12 minutes. |
| B | 0.5 | 12–15 minutes. |
| C | 1 | 45 minutes. |
| D | 3 | 6 hours. |
| E | 4 | 10–12 hours. |
| F | 6 | 24 hours. |

It may often be particularly advantageous to employ a magnesium oxide powder as a catalyst that has a setting time according to the indicated A.S.T.M. specification between about 0.5 and 3 hours.

Magnesium oxychloride or magnesium oxysulfate slurry catalysts can be prepared readily by mixing a suitably active type of magnesium oxide powder with an aqueous solution of magnesium chloride or its equivalent or magnesium sulfate or its equivalent or mixed salt solutions of the indicated variety. In preparing magnesium oxychloride slurry catalysts, the mole ratio of magnesium oxide to magnesium chloride can be varied between about 5 and 17 to 1, respectively, when employing a 25 to 15 degree Baumé solution of the chloride. A greater catalyst activity may be obtained when larger proportions of the oxide are in the slurry. In a similar manner, magnesium oxysulfate slurry catalysts may be prepared by mixing between about 8 and 25 moles of magnesium oxide with each mole of magnesium sulfate in a 26 to 16 degree Baumé solution thereof. Frequently, the oxychloride and oxysulfate slurry catalysts possibilitate the achievement of shorter self-setting periods with the coated sands in comparison with the periods obtained when magnesium oxide is employed solely as the catalyst. When slurry catalysts are employed, the weight ratio of catalyst to be utilized is calculated from the total slurry content.

Regardless of the specific catalyst or combination of catalysts that is employed, it is essential to achieve a uniform and thorough dispersion and mixing of the catalyst in the phenolic liquid resin and to homogeneously blend the resin/catalyst mixture, either independently or in combination, with the sand particles that are being coated.

The initial self-setting characteristics of the resin coating on the sand are also influenced by the relative quantity of catalyst that is present therein. Greater quantities of included catalyst generally shorten the initial self-setting time of the coating. A greater quantity of the catalyst also tends to alter the thermoplastic characteristics of the coated sand compositions after the resin coating has initially auto-hardened by raising the softening or melting point of the coating. This is illustrated in the following Table 2, wherein the proportions of various magnesium oxide catalysts were varied in several compositions with a phenolic liquid resin (similar to that utilized for deriving the data presented in Table 1) to determine the effect on the auto-hardening time at room temperature of the compositions.

*Table 2.—Auto-hardening time of compositions containing varied proportions of magnesium oxide catalyst*

| Composition | G | H | J | K |
|---|---|---|---|---|
| Percent by wt. of Liquid Resin in Composition. | 94.40 | 88.90 | 77.80 | 64.00. |
| Percent by wt. of MgO Catalyst in Composition. | 5.60 | 11.10 | 22.20 | 36.00. |
| Percent by wt. of Catalyst in Composition based on Resin. | 5.94 | 12.00 | 28.50 | 56.20. |
| Working or Mixing Time Permissible With Composition Formulated with ½ Hr. MgO Catalyst, minutes. | 30 | 20 | 10 | 5. |
| Same With Equivalent Composition Using 6 Hr. MgO Catalyst. | 90 | 45 | 30 | 15. |
| Total Auto-Hardening Time of Composition Formulated With ½ Hr. MgO Catalyst, Minutes. | 144 | 48 | 18 | 8. |
| Same with Equivalent Composition Using 6 Hr. MgO Catalyst. | 160 | 72 | 24 | 12. |
| Melting or Softening Point in ° F. of Auto-Hardened Compositions. | 150 | 230 | 392 | greater than 480. |

As is apparent, shorter self-setting periods of the resin coating result in less permissible working or mixing time in which to distribute the resin coating over the sand.

Hexamethylene tetramine is ordinarily highly satisfactory for utilization as an accelerator curing agent in the coated sand compositions of the invention. Generally, between about 0.1 and 1.0 percent by weight of the curing agent is a suitable quantity to employ, based on the total weight of the composition. In many instances the amount of accelerator curing that is employed may be roughly one-tenth the quantity of phenolic liquid resin that is utilized in the composition. As indicated, the employment of an accelerator curing agent such as hexamethylene tetramine or its equivalent is an optional matter which may often be dispensed with without sacrificing completely the fabricating qualities of the coated sand compositions. The accelerator curing agent functions in a somewhat analogous manner to the "novolak" or "lignin type" resin additament in enhancing the thermoplasticity of the compositions.

Certain wax ingredients may also be incorporated with benefit in minor proportions in the coated sand compositions of the invention to eliminate traces of tackiness and improve the free-flowing characteristics of the composition. By way of illustration, octadecenamide, a light-colored synthetic wax that is available under the trade-designation "Acrawax" from the Glyco Products Company and like substances may often be employed for such purposes. Paraffin and carnauba waxes and the like may also be utilized in some instances. Ordinarily, a very minor proportion of the wax ingredient, as for example, between about 0.05 and 0.2 percent by weight of the coated sand composition may be found satisfactory.

The invention is further illustrated in and by the following example wherein, unless otherwise indicated, all parts and percentages are to be taken by weight.

EXAMPLE

Several coated sand compositions in accordance with the invention were prepared for shell mold fabrication by premixing the catalyst with the sand in an efficient mulling apparatus and then wet coating the granules with a liquid phenolic resin that had about a 70 percent content of solids, a viscosity of about 500 centipoises at 77° F., a pH of about 5 and a mole ratio of formaldehyde to phenol of about 1.45:1. The flow-assisting resin was incorporated in the composition after the sand had been wet with the liquid phenolic resin. The coated sand was continued to be mixed in each case until the applied resin had autohardened. After a dry, free-flowing condition had been achieved, each of the coated sand compositions was shell molded by conventional dump-box practice into various shell mold forms that were purposely designed along representatively difficult pattern lines containing horizontal flat areas and vertical projections. In the preparation of the shell molds from each of the coated sand compositions, pattern temperatures between 425 to 500° F. were employed with contact times of the sand composition on the pattern between 12 and 20 seconds. Each of the shell molds was subsequently cured in a gas fired oven at a temperature in the neighborhood of 600° F. for periods of time from 23 to 45 seconds. Little or no dust or odor was generated by the shell molds that were fabricated from the coated sand compositions and they did not delaminate or "peel off" on the pattern in an undesirable manner during their fabrication. In the following Table 3 is set forth the formulation of each of the coated sand compositions along with data relating to some of them concerning the time cycle that was necessary to obtain a free-flowing condition in the composition from the initial wet mixing.

*Table 3.—Shell mold compositions*

| Composition | Percent Sand | | Percent Liquid Resin | Percent Hexa-methylene tetramine | Percent ½ Hr. MgO Catalyst (40 mesh) | Percent Flow-Assisting Resin | | Time Cycle Wet Mix to Dry Free-Flowing Coated Sand, minutes |
|---|---|---|---|---|---|---|---|---|
| | Vassar AFS 100 | Wedron AFS 116 | | | | Novolak | "Vinsol" | |
| L1 | | 93.525 | 5.00 | | 0.625 | 0.85 | | 30 |
| L2 | 93.525 | | 5.00 | | 0.625 | 0.85 | | 30 |
| M | | 94.40 | 4.00 | | 0.50 | 1.60 | | 29 |
| N | | 94.02 | 4.00 | 0.28 | 0.70 | 1.00 | | 25 |
| P | | 94.67 | 3.00 | 0.21 | 0.52 | 1.60 | | 25 |
| Q | | 92.08 | 6.00 | 0.42 | 0.75 | | 0.75 | 20 |
| R | | 91.58 | 6.00 | 0.42 | 1.00 | | 1.00 | 20 |
| S | | 90.58 | 6.00 | 0.42 | 1.00 | | 2.00 | 15 |
| T | | 94.05 | 4.00 | 0.28 | 0.67 | | 1.00 | 20 |
| U | 96.30 | | 2.00 | | 0.50 | 1.20 | | (a) |
| V | 95.69 | | 3.00 | | 0.87 | 0.44 | | (a) |
| W | 94.53 | | 3.00 | | 0.87 | 1.60 | | (a) |
| X | 92.91 | | 4.00 | | 1.16 | 1.93 | | (a) |
| Y | 93.48 | | 3.00 | | 0.87 | 2.65 | | (a) |
| Z | 94.47 | | 3.00 | | 0.93 | 1.60 | | 12½ | a Not observed under table.

Excellent molding performance in the preparation of grey iron castings was obtained with the shell molds made from each of the compositions. The castings all had smooth surfaces and clean edges and indentations. Shell molds prepared from composition "Z," by way of particularization, were capable, in vertical disposition, without any backing, of holding 26½ pound castings and, during the molding, were observed to fire in an average time of 10 seconds after the pour and to have completed their burn out, with very little smoke and flame, about 20 seconds after firing.

Similar good results were obtained when equivalent magnesium oxychloride and oxysulfate catalysts were employed in equivalent coated sand compositions.

It is to be appreciated that it is within the comprehension of the present invention to prepare and provide other refractory structures besides shell molds and the like that may be desired to be fabricated from the compositions and in accordance with the invention.

Certain changes and modifications can be readily entered into the practice of the present invention without substantially departing from its intended spirit and scope. Therefore, it is to be fully understood that the invention is not to be limited or otherwise restricted to or by the preferred didactic embodiments thereof which are included in the foregoing description and specification. Rather, it is to be interpreted and construed in the light of what is set forth and defined in the hereto appended claims.

What is claimed is:

1. Coated sand composition for the fabrication of shell molds and the like which consists essentially of at least about 86 percent by weight, based on the weight of the composition, of sand; between about 1 and 10 percent by weight, based on the weight of the composition, of an aqueous phenolic liquid resin, said phenolic liquid resin being an aqueous phenol-formaldehyde liquid resin that has a greater than 1:1 mole ratio of formaldehyde to phenol, respectively, a solids content in the aqueous vehicle of at least 50 percent by weight, a pH between 5 and 9 and a viscosity at 77° F. between about 100 and 1000 centipoises; between about 0.5 and 3.0 percent by weight, based on the weight of the composition, of a flow-assisting resin that is selected from the group consisting of a "novolak type" phenol-formaldehyde resinous condensation product, said novolak resin being a phenol-formaldehyde condensation product that contains from 3 to 10 phenolic units in its molecule and has a less than 1:1 mole ratio of aldehyde to phenol, respectively, and a thermoplastic "lignin type" resin derived from wood, said lignin type resin being a thermoplastic material that is derived from wood and contains methoxyl and hydroxyl groups in its molecule; between about 0.5 and 2.0 percent by weight, based on the weight of the composition, of a catalyst selected from the group consisting of powdered magnesium oxide having a setting time of less than about 6 hours, aqueous slurried magnesium oxychloride, aqueous slurried magnesium oxysulfate and mixtures thereof.

2. The composition of claim 1 containing at least about 90 percent by weight of sand and between about 2 and 6 percent by weight of the phenolic liquid resin.

3. The composition of claim 1 wherein the catalyst is magnesium oxide powder having a setting time between about 0.10 and 6 hours.

4. The composition of claim 1 wherein the catalyst is magnesium oxide powder having an average particle size not larger than about 40 mesh in the U.S. sieve series and a setting time between about 0.5 and 3 hours.

5. The composition of claim 1 wherein the catalyst is a magnesium oxychloride slurry that contains from 5 to 17 moles of magnesium oxide per mole of magnesium chloride in an aqueous solution of the latter having a 25 to 15 degree Baumé concentration.

6. The composition of claim 1 wherein the catalyst is a magnesium oxysulfate slurry that contains from about 8 to 25 moles of magnesium sulfate in an aqueous solution of the latter having a 26 to 16 degree Baumé concentration.

7. The composition of claim 1 wherein the phenolic liquid resin is an aqueous phenol-formaldehyde liquid resin that has a greater than 1:1 mole ratio of formaldehyde to phenol, respectively, a solids content of about 60 to 70 percent by weight, a pH between 5 and 7 and a viscosity at 77° F. between about 100 and 500 centipoises.

8. The composition of claim 1 wherein the flow-assisting resin is a "novolak type" resin.

9. The composition of claim 1 and including hexamethylene tetramine as an accelerator curing agent.

10. The composition of claim 1 wherein the sand has an AFS fineness number between 25 and 180.

11. The compsition of claim 1 wherein the sand has an AFS fineness number between 50 and 125.

12. A shell mold that has been fabricated from a coated sand composition in accordance with that set forth in claim 1.

13. The composition of claim 1, and including, in addition thereto and in combination therewith, between about 0.1 and 1 percent by weight, based on the total weight of the composition, of an accelerator curing agent for phenolic resins.

14. A composition in accordance with the composition set forth in claim 7, wherein the viscosity at 77° F. of said phenolic liquid resin is about 500 centipoises.

15. Method for the preparation of a thermoplastic, thermosetting coated sand composition that is particularly adapted for the fabrication of shell molds and the like which comprises thoroughly mixing and coating sand having an AFS fineness number between about 25 and 180 with a composition consisting essentially of between about 2 and 15 percent by weight, based on the weight of the composition, of an aqueous phenolic liquid resin, and between about 0.5 and 2 percent by weight, based on the weight of the composition, of a catalyst selected from the group consisting of powdered magnesium oxide having a setting time of less than about 6 hours, aqueous slurried magnesium oxychloride, aqueous slurried magnesium oxysulfate, and mixtures thereof, said phenolic liquid resin being an aqueous phenol-formaldehyde liquid resin that has a greater than 1:1 mole ratio of formaldehyde to phenol, respectively, a solids content in the aqueous vehicle of at least 50 percent by weight, a pH between 5 and 9 and a viscosity at 77° F. between about 100 and 1000 centipoises; intimately dispersing in the liquid resin coated sand while it is still wet and being mixed between about 0.5 and 3.0 percent by weight of a flow-assisting resin that is selected from the group consisting of a "novolak type" phenol-formaldehyde condensation product, said novolak resin being a phenol-formaldehyde condensation product that contains from 3 to 10 phenolic units in its molecule and has a less than 1:1 mole ratio of aldehyde to phenol, respectively, and a thermoplastic "lignin type" resin derived from wood, said lignin type resin being a thermoplastic material that is derived from wood and contains methoxyl and hydroxyl groups in its molecule; and subsequently permitting the applied resin coating to auto-harden to a thermoplastic, thermosetting condition while continuously mixing said mixture during said auto-hardening.

16. The method of claim 15 wherein the mixing of said resin-coated sand mixture during said auto-hardening is continued until a preponderant proportion of said composition has an average particle size that is finer than about 40 mesh in the U.S. sieve series.

17. The method of claim 15 wherein the catalyst is intimately dispersed throughout the sand before the phenolic liquid resin is incorporated in the composition.

18. The method of claim 15 and including the step of incorporating between about 0.1 and 1.0 percent by weight, based on the weight of the composition, of an accelerator curing agent in the phenolic liquid resin before applying said phenolic liquid resin to the sand.

19. Method for fabricating shell molds and the like which consists essentially of thoroughly mixing from about 86 to 98 parts by weight of sand having an AFS fineness number between about 25 and 180 with a coating of between about 1 and 10 parts by weight of an aqueous liquid phenolic resin, said phenolic liquid resin being an aqueous phenol-formaldehyde liquid resin that has a greater than 1:1 mole ratio of formaldehyde to phenol, respectively, a solids content in the aqueous vehicle of at least 50 percent by weight, a pH between 5 and 9 and a viscosity at 77° F. between about 100 and 1000 centipoises in which there has been incorporated between about 0.5 and 2.0 parts by weight of a catalyst selected from the group consisting of powdered magnesium oxide having a setting time of less than about 6 hours, aqueous slurried magnesium oxychloride, aqueous slurried magnesium oxysulfate, and mixtures thereof; intimately dispersing in the liquid resin coated sand while it is still wet and being mixed between about 0.5 and 3.0 parts by weight of a flow-assisting resin that is selected from the group consisting of a "novolak type" phenol-formaldehyde condensation product, said novolak resin being a phenol-formaldehyde condensation product that contains from 3 to 10 phenolic units in its molecule and has a less than 1:1 mole ratio of aldehyde to phenol, respectively, and a thermoplastic "lignin type" resin derived from wood, said lignin type resin being a thermoplastic material that is derived from wood and contains methoxyl and hydroxyl groups in its molecule; permitting the resin coating on the sand of the resulting mixture to auto-harden to a thermoplastic, thermosetting mass while coninuously mixing said mixure during said auto-hardening to cause a proponderant proportion of the coated sand mixture to have an average particle size finer than about 40 mesh in the U.S. sieve series; placing the resulting coated sand mixture in contact with a shell mold pattern at a temperaure beween abou 425 and 500° F. for a period of time sufficient to permit a layer of the coated sand mixture to become thermoplastic and assume the form of said pattern; removing excess coated sand from the thermoplastically cohering formed mixture; and subsequently curing the shell mold formed coated sand mixture at a temperature between about 250 and 600° F. until it has become thermoset.

20. The method of claim 19 and including, in addition thereto and in combination therewith, the additional step of incorporating in said aqueous liquid phenolic resin between about 0.1 and 1 percent by weight, based on the total weight of the resulting mixture, of an accelerator curing agent for phenolic resins.

References Cited in the file of this patent

UNITED STATES PATENTS

| 2,662,067 | Less et al | Dec. 8, 1953 |
| 2,806,832 | Drumm et al. | Sept. 17, 1957 |

FOREIGN PATENTS

| 305,237 | Great Britain | May 2, 1930 |